(12) United States Patent
Koch et al.

(10) Patent No.: US 7,767,086 B2
(45) Date of Patent: Aug. 3, 2010

(54) FILTER ELEMENT

(75) Inventors: Edwin Koch, Marpingen (DE);
Matthias Schwender, Kirkel (DE);
Sören Lange, Ketsch (DE)

(73) Assignee: Hydac Filtertechnik GmbH,
Sulzbach/Saar (DE)

( * ) Notice: Subject to any disclaimer, the term of this patent is extended or adjusted under 35 U.S.C. 154(b) by 740 days.

(21) Appl. No.: 10/588,259

(22) PCT Filed: Sep. 28, 2004

(86) PCT No.: PCT/EP2004/010824
§ 371 (c)(1),
(2), (4) Date: Apr. 6, 2007

(87) PCT Pub. No.: WO2005/075055
PCT Pub. Date: Aug. 18, 2005

(65) Prior Publication Data
US 2007/0251875 A1    Nov. 1, 2007

(30) Foreign Application Priority Data
Feb. 3, 2004   (DE) ................. 10 2004 005 202

(51) Int. Cl.
*B01D 35/14* (2006.01)
(52) U.S. Cl. ................. 210/243; 210/493.2; 210/497.01
(58) Field of Classification Search ................. 210/243, 210/493.2, 497.01
See application file for complete search history.

(56) References Cited

U.S. PATENT DOCUMENTS

| 3,933,643 | A | * | 1/1976 | Colvin et al. ............... 210/243 |
| 4,999,108 | A | * | 3/1991 | Koch et al. .................. 210/243 |
| 6,099,726 | A | | 8/2000 | Gembolis et al. |
| 6,168,713 | B1 | | 1/2001 | Sekine et al. |
| 7,128,835 | B1 | * | 10/2006 | Hundley et al. ............. 210/243 |

FOREIGN PATENT DOCUMENTS

| DE | 102 50 969 | 5/2004 |
| EP | 0 402 657 | 12/1990 |
| GB | 2 300 367 | 11/1996 |
| WO | WO 2004/009215 | 1/2004 |

* cited by examiner

*Primary Examiner*—Matthew O Savage
(74) *Attorney, Agent, or Firm*—Roylance, Abrams, Berdo & Goodman, L.L.P.

(57) ABSTRACT

A filter element includes a filter medium (10) extending between two end caps (12, 14) that are respectively connected to an associable end region (16, 18) of the filter medium (10). The filter medium is supported at least on one side on a supporting tube (20). At least one of the end caps (14) and/or at least one end region (16, 18) of the filter medium (10) has a contacting device (22) and/or the respective end cap (14) itself or its parts are embodied in such a way as to derive the electrostatic charges, especially occurring during the operation of the filter element to ensure that the charge generated on the filter medium (Meshpack) by tribo-electrical effects can escape towards a mass point or a mass site via the contacting device (22) or the respective end cap (14).

12 Claims, 2 Drawing Sheets

FILTER ELEMENT

FIELD OF THE INVENTION

The present invention relates to a filter element comprising a filter medium extending between two end caps. Each end cap is connected to one assignable end area of the filter medium supported at least on one side on a support tube.

BACKGROUND OF THE INVENTION

Filter elements of this type are conventional, and are widely used, for example, in hydraulic systems in system branches through which hydraulic oils flow. The known filter elements are not entirely satisfactory with respect to their operating reliability and the stability of the beta value which is decisive for filter performance. In particular, for high flow rates there is the danger that at the connecting site where the ends of the filter mat web are combined into a ring body forming the filter cylinder, deformations or damage will occur due to the differential fluid pressure active at the connecting site. These adverse effects and/or deformations of the folds in the area of the connecting site are generally termed "buckling of the folds" in the technical terminology.

To counteract this problem, for example, in the DE 102 50 969 A1 published at a later date, it was suggested that the sequence of folds for the filter medium of the filter element be selected such that each fold extending over the entire radial extension of the intermediate space from the outer jacket surface to the inner support tube is followed by one fold with a radially inside fold back located at a distance from the inner support tube of the element and followed in turn by a fold extending over the entire radial extension of the intermediate space. This yields improved beta value stability, even at high flow rates.

Furthermore, in the known solutions the structure of the filter media and filter elements can vary greatly from manufacturer to manufacturer. For simple paper elements, the filter mats are made as filter media without supporting wire gauze. At higher differential pressures on the filter elements, the filter folds can be pressed together. This pressing results in the drainage possibility for folded mats being reduced with many folds remaining unused for filtration. Conversely, higher quality elements have a multilayer mat structure for the filter medium, for modern filter media a six- and more layer structure indeed being possible, for example, in the form of a succession of following layers; an outer support, a protective nonwoven layer, a prefilter layer, a main filter layer, a support nonwoven layer, and an inner support. Moreover, when the filter material is a filter mat web built up in several layers as described above, they have an outer support forming the outer jacket surface in the form of a lattice or gauze structure. This can be a polyamide- or polyester-based structure and alternatively the multilayer filter mat web can have a metallic grating as the support forming the outer jacket surface. The respective filter medium built up in several layers is also termed a mesh pack in the technical terminology. Generally the dirty fluid flows through it in one direction (often in general from the outside to the inside), with the dirty components remaining in the filter medium.

To make the filter element stable under pressure, the interior has a support tube, preferably of plastic material and provided with perforations supporting the filter medium against the intended flow direction. The two end caps between which the filter medium, and if necessary the plastic support tube extends, are likewise made preferably from plastic materials. Especially, the plastic support tube is made as an injection molded part. Since the filter medium is generally cemented to the end caps in the area of the filter medium free ends, the cement used, often in the form of an epoxy resin cement, produces a type of insulating layer between the inserted filter medium, the two end caps, and/or the support tube. The insulating effects are further intensified by the support tube being preferably made longer than the actual filter medium (mesh pack), so that forces cannot act on it in the longitudinal direction. If this application of force cannot be avoided, it is possible that as a result of the compressive stresses occurring when the fluid flows through the filter medium the filter medium is damaged and in this way then adequate filtration performance can no longer be ensured.

The indicated insulation structure, due to the insulating layers between the filter medium, the end caps, and the support tube, can cause electrostatic charging especially of the filter medium when fluid passes with dirt which may be present on the filter medium. Due to the potential differences produced in this way, within the filter element discharges can suddenly occur between statically charged filter element parts, especially in the form of the filter medium and electrically conductive components, especially in the form of the generally metallic filter housing in which the filter element is held. The result is that electrostatic discharges occur. This electrostatic discharge must be considered critical with respect to the combustibility of the media to be filtered, such as hydraulic oil, heavy oil fuels such as diesel fuels or the like. The electrostatic discharges can also lead to damage of the oil and of the sensitive filter medium material.

BACKGROUND OF THE INVENTION

An object of the present invention is to provide improved filter elements while maintaining their advantages, specifically high operating reliability and high beta value stability, even at high flow rates on the medium to be filtered such that especially in operation of the filter element no potential differences can occur between parts of the filter element leading to electrostatic discharges.

This object is basically achieved by a filter element where at least one of the end caps and/or at least one end area of the filter medium has a contact-making means and/or the respective end cap itself or parts of it are made dissipative. For purposes of dissipating the electrostatic charges occurring especially in filter element operation by the fluid medium, it is ensured that the charge generated by triboelectric effects on the filter medium (mesh pack) can drain by contact-making means or the respective end cap to a ground point, for example, formed from metallic housing parts in which the filter element can be held with formation of a filter device. As a result of this dissipation, voltage peaks within the filter element are avoided, with their adverse result that spark discharges can occur which could damage the filter element itself.

In one preferred embodiment of the filter element of the present invention, the contact-making means comprises conductive contact elements which penetrate a cement bed (epoxy resin cement) forming a type of insulating layer between the end cap and the end area of the filter medium accommodated by this end cap to come into dissipative contact with the filter medium. Preferably, the conductive contact elements are contact pins making contact with the mesh pack with their one free end in the cement bed and in the area of the other free end standing vertically upright on the respective end cap. With this solution, the insulating layer of the cement bed is bridged by contact elements in the form of contact pins, with the pins being dimensioned such that in any case the thickness of the cement bed and production tolerances for the filter medium (mesh pack) for dissipating the charge potential are reliably penetrated. The charge prevailing in the filter medium can then drain by this end cap to the housing as the ground point via the dissipative pins preferably injected together with the O-ring-shaped cap as the end cap of the filter medium. Breakdown of the charge with spark formation within the element is then reliably prevented.

In another preferred embodiment of the filter element of the present invention, plastics with a conductivity additive, conductive coatings, or intrinsically conductive plastics are used to form the dissipative end cap or its parts. High quality steel fibers, aluminum flakes, metal-coated glass fibers, or carbon fibers including conductive carbon black are especially well suited as conductivity additives for filled plastics. Dissipative coatings can be applied galvanically or by high vacuum vapor deposition, by painting with conductive enamel or by flame, arc or plasma spaying. Furthermore, the application of nanolayers is conceivable here. Intrinsically conducting polymers (ICP) are plastics in which conductivity is achieved by doping. Plastics suitable for this purpose are especially polyacetylene, polypyrrole, polythiophene and polyaniline.

In another preferred embodiment of the filter element of the present invention, the respective end cap has annular surfaces projecting to the inside and outside, between which the assignable end area of the filter medium fits. The annular surfaces accommodate the contact-making means not only between themselves, but are also used as a lateral stop for the cement as soon as it is added to the end cap for a connecting process.

In another preferred embodiment of the filter element of the present invention, at least that end cap with the contact-making means has a connecting part for fixing the filter element in a filter housing and a sealing means, especially in the form of an O-ring located between the filter housing and the end cap of the filter element, made dissipative. Due to the dissipative O-ring the filter element with its front surface need not necessarily be pressed against the housing surrounding the filter element to produce the necessary dissipative contact. Rather, in addition or alternatively, a version of the filter element can be conceivable with a dissipative O-ring to discharge the potential difference.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
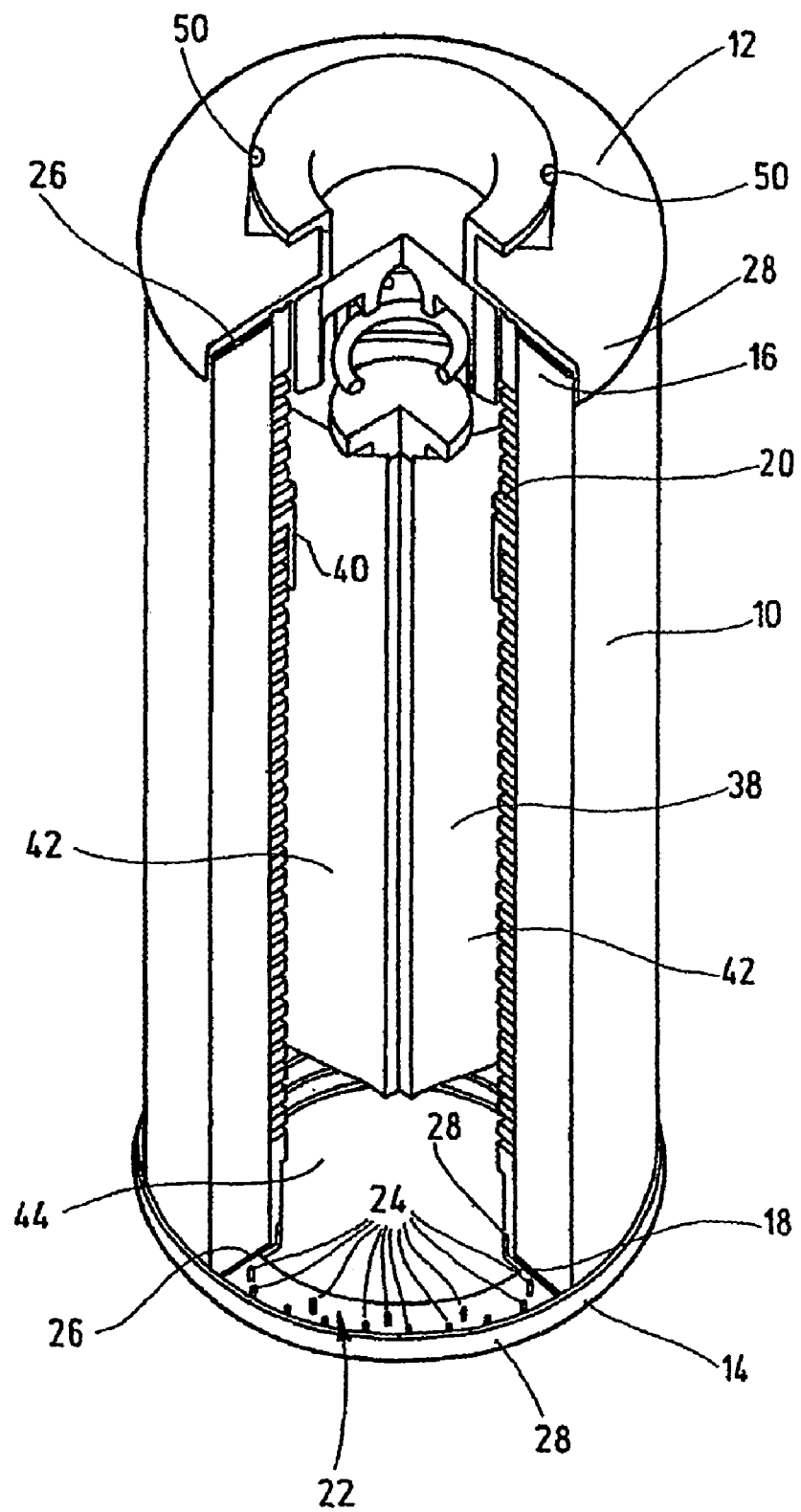
FIG. 1 is a perspective view, a partially cutaway of a filter element according to one exemplary embodiment of the present invention.

The filter element according to the exemplary embodiment of the present invention has a filter medium 10 extending between the two, first and second end caps 12, 14 and surrounding a longitudinal axis with each end cap extending generally perpendicularly to the longitudinal axis and connected to an assignable first or second end area 16, 18 of the filter medium 10. The filter medium is otherwise supported on its inner peripheral side on a support tube 20. As viewed in FIG. 1, the lower or first end cap 14 has a contact-making means or contact maker 22 for dissipating an electrostatic charge occurring in operation of the filter element in particular.

The contact-making means 22 includes individual conductive contact elements, in particular in the form of individual contact pins 24 extending through a cement bed 26 forming a type of insulating layer between the end cap 14 and the accommodated end region 18 of the filter medium 10 to make dissipative contact with the filter medium 10. The contact pins 24 penetrate the cement bed 26, and stand vertically upright on the respective end cap 14 in the area of pin other free ends. This configuration can be provided fundamentally on the upper and lower end caps 14, 16. Each of the contact pins have opposite end portions with one end portion penetrating the respective cement bed and being fixed to the first end cap and the other end portion being a free end portion and extending generally parallel to a longitudinal axis of the filter element from the first end cap. Placement on only one end cap is adequate to ensure dissipation by this end cap 14 with the ground points of the housing (not shown) in which the filter element can be held with the formation of a filter device.

Figure 2:
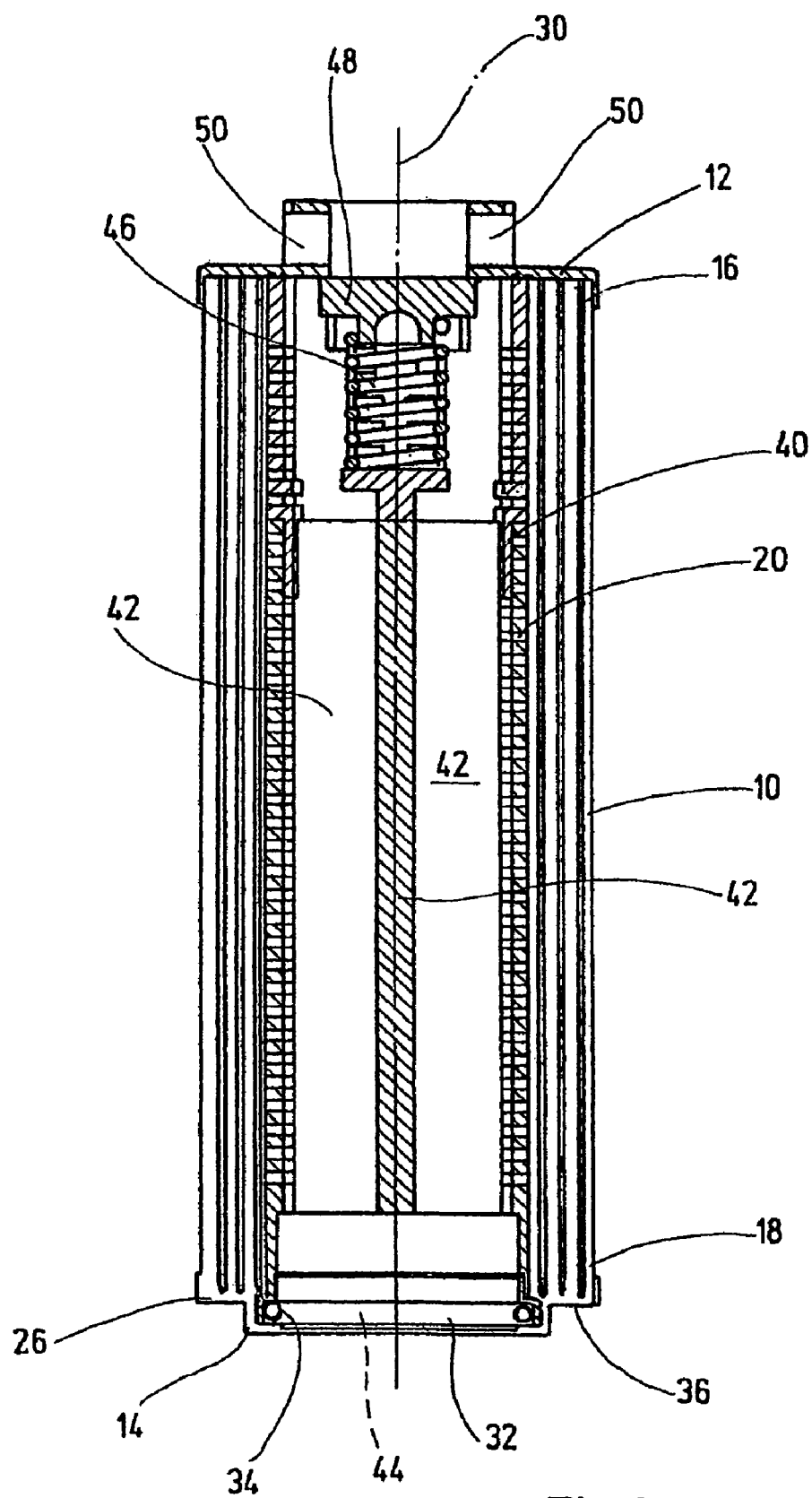
FIG. 2 is a side elevational view in section through the filter element shown in FIG. 1.

As is to be seen in particular from the longitudinal section of FIG. 2, the filter medium 10 can be built up as a multilayer filter mat, for example, with six layers. The layers follow each other in succession, and have the following: an outer support, a protective nonwoven layer, a prefilter layer, a main filter layer, a support nonwoven layer, and an inner support. For the outer support, a polyamide lattice or a polyester fabric is possible. The inner support of the filter mat can be supported on the outer periphery of the fluid-permeable support tube 20 or can be formed by this support tube 20 itself. The filter mat can be reinforced on one side with fabric materials of plastic or metal.

Since for reasons of weight and recycling, it is a good idea to build up the entire filter element from plastic materials. This forming is accompanied by the problem of increasingly static charging as arises when the fluid to be filtered, for example, as in this case from the outside to the inside, flows through the filter medium 10. In these cases within the plastic filter element, potential or charge differences arise with the result that when a definable charge difference is exceeded, sparkover or breakdown with the corresponding electrostatic discharge occurs. Since fundamentally the medium to be filtered is combustible, there is a risk in operation with pure plastic filter elements. Conversely, based on the contact-making means 22 with the contact pins 24, it is possible to discharge the potential differences. Charges occurring by the end caps, especially the lower end cap 14, discharge into the ground point formed by the housing. Statically relevant potential differences in addition to a electrostatic discharge are thus reliably avoided.

The illustrated filter medium 10 has a cylindrical filter mat. The possibility also exists of making the individual filter mat layers pleated along a cylindrical periphery to increase the effective filter surface. A filter mat structure is also possible as is indicated in DE 102 50 969 A1 published at a later date. When the filter medium 10 is built up with its individual layers, it should preferably be made of correspondingly dissipative plastic materials. As is furthermore to be seen from FIG. 1 in particular, the respective end cap 12, 14 to the inside and outside is provided with one projecting annular surface 28 each. Surfaces 28 integrate the cement bed 26 therebetween. Between the two annular surfaces 28 of the lower end cap 14, the individual contact pins 24 extend in a parallel longitudinal alignment to the longitudinal axis 30 of the filter element. The conductive contact elements or contact pins 24 can be made of metal. Preferably, they are made from a conductive plastic material which can be injected jointly with the end cap 14 in one working cycle such that the contact pin-end cap connection is separate from the cement bed.

The respective end cap 14 with the contact-making means 22 can have a connecting part 32 (FIG. 2) for fixing the filter element in a filter housing (not shown). One sealing means or seal 34, for example, in the form of a conventional O-ring, is located between the filter housing and one end cap 14 of the filter element, and is made dissipative. Generally this O-ring would not have to be dissipative, since the filter element with its front surface 36 is pressed against the seating part of the filter housing by which conductive contact occurs. Accordingly it would however also be possible to effect the pertinent discharging via the O-ring of the sealing means 34 if the O-ring is made of dissipative material or is coated in this way. As is furthermore to be seen from FIG. 1, the contact pins 24 are configured in concentric circles to the longitudinal axis 30 of the filter element within the end cap 14, the imaginary circle extending outermost has more contact pins 24 than the inner circle.

Within the support tube 20 along its ribs bordering the fluid passage sites, a separating segment 38 is suspended or clipped accordingly at the connecting point 40. The individual separating walls 42 of this segment 38 enables flow guidance within the filter element, in the direction of the penetration site 44 in the area of the lower end cap 14. In an extension to the top, the separating segment 38 has a plate-like closing body 48 actuated by a compression spring 46 and assuming the bypass function. When the filter medium 10 is clogged, the uncleaned fluid can enter the interior of the filter element 10 via diametrically opposite entry points 50 in the upper end cap 12, to flow through the filter element 10 and emerge in the direction of the lower penetration site 44. The bypass function can be adjusted in terms of its triggering behavior by the definable spring force of the compression spring 46.

The contact-making means 22 need not be limited to one solution in which the contact pins of one end cap or the end caps 12, 14 in the cement bed 26 make contact with the mesh pack. The necessary contact can also be made via conductive mat webs in the form of a gauze or the like into which the cement penetrates. It would also be conceivable from the sides of the filter medium 10 to produce a conductive connection to the dissipative end cap areas, for example, by corresponding wire or platinum connections (not shown).

With the present invention, it is in any case possible, even for pure plastic elements or for those filter elements which are made primarily of plastic materials, to reliably address the problem of static charging in addition to electrostatic discharge, without the modification having an adverse effect on the pressure stability values, beta values, filtration performance, etc.

As an alternative or in addition to the described contact-making means 22, the respective end cap 14 itself or parts of it can also be made dissipative. To form the dissipative end cap 14 or its parts, plastics with a conductivity additive, conductive coatings or intrinsically conductive plastics are especially well suited. High quality steel fibers, aluminum flakes, metal-coated glass fibers, carbon fibers, and conductive carbon black are well suited as conductivity additives for filled plastics. Dissipative coatings can be applied galvanically or by high vacuum vapor deposition, by painting with conductive enamel, or by flame, arc or plasma spaying. The application of nanolayers is also conceivable here. Intrinsically conducting polymers (ICP) are obtained preferably by doping, with the following plastics being considered especially well suited for this purpose: polyacetylene, polypyrrole, polythiophene and polyaniline. This list does not include all the plastics that may be considered well suited for said purpose.

While one embodiment has been chosen to illustrate the invention, it will be understood by those skilled in the art that various changes and modifications can be made therein without departing from the scope of the invention as defined in the appended claims.

What is claimed is:

1. A filter element, comprising:
    a filter medium with opposite first and second end areas surrounding a longitudinal axis;
    first and second end caps coupled to said first and second end areas, respectively, by cement beds forming an insulating layer between each said end cap and the respective end area, said end caps having major planes extending generally perpendicularly to said longitudinal axis;
    a support tube supporting said filter medium on one side of said filter medium; and
    contact pins on at least said first end cap for dissipating electrostatic charges occurring in filter element operation, said contact pins penetrating the respective cement bed making dissipative contact with said filter medium, each of said contact pins having opposite end portions with one end portion penetrating the respective cement bed and fixedly connected to said first end cap separately from the respective cement bed and the other end portion being a free end portion extending generally parallel to said longitudinal axis from said first end cap.

2. A filter element according to claim 1 wherein said first end cap and said contact pins are formed of a plastic with a conductivity additive.

3. A filter element according to claim 1 wherein said first end cap and said contact pins have conductive coatings.

4. A filter element according to claim 1 wherein said first end cap and said contact pins are formed of an intrinsically conductive plastic.

5. A filter element according to claim 1 wherein said filter medium comprises a pleated or cylindrically shaped filter mat with filter plies in several layers on top of one another and of entirely or partially dissipative plastic materials.

6. A filter element according to claim 5 wherein said filter mat is reinforced on one side with fabric materials of plastic or metal.

7. A filter element according to claim 1 wherein said filter medium is supported on said support tube in a fluid flow direction through said filter medium, said support tube comprising passages and being of plastic material.

8. A filter element according to claim 1 wherein said contact pins are of conductive metal or dissipative plastic.

9. A filter element according to claim 1 wherein said contact pins are arranged in circles concentric to a longitudinal axis of the filter element.

10. A filter element according to claim 1 wherein said first end cap comprises inside and outside projecting annular surfaces receiving said first end area of said filter medium therebetween.

11. A filter element according to claim 1 wherein said first end cap comprises a connecting part for fixing the filter element in a filter housing; and
    a dissipative seal is on said first end cap for engaging the filter housing.

12. A filter element according to claim 11 wherein said seal is an O-ring.

* * * * *